US009955710B2

United States Patent
Hyde et al.

(10) Patent No.: US 9,955,710 B2
(45) Date of Patent: May 1, 2018

(54) SYSTEMS TO NITROGEN-INFUSE AND DISPENSE BEVERAGES

(71) Applicant: Phoenix Roasters, Duluth, GA (US)

(72) Inventors: Robert D. Hyde, Springfield, VA (US); James G. Neighbors, Burke, VA (US); Brian T. Holland, Duluth, GA (US); Jackie Fendley, Duluth, GA (US); Robert F. Hoskin, Lawrenceville, GA (US)

(73) Assignee: Cascade and Phoenix on Tap, LLC, Duluth, GA (US)

( * ) Notice: Subject to any disclaimer, the term of this patent is extended or adjusted under 35 U.S.C. 154(b) by 0 days. days.

(21) Appl. No.: 15/460,383

(22) Filed: Mar. 16, 2017

(65) Prior Publication Data
US 2017/0265499 A1  Sep. 21, 2017

Related U.S. Application Data

(60) Provisional application No. 62/309,006, filed on Mar. 16, 2016.

(51) Int. Cl.
*A23L 2/54* (2006.01)
*A47J 31/44* (2006.01)

(52) U.S. Cl.
CPC ............ *A23L 2/54* (2013.01); *A47J 31/4403* (2013.01); *A23V 2002/00* (2013.01)

(58) Field of Classification Search
CPC ..... A23L 2/54; A47J 31/4403; A23V 2002/00
See application file for complete search history.

(56) References Cited

U.S. PATENT DOCUMENTS

| 4,610,888 A | 9/1986 | Teng et al. |
| 4,742,942 A | 5/1988 | Dokos et al. |
| 5,565,149 A | 10/1996 | Page et al. |
| 5,842,600 A * | 12/1998 | Singleterry ............... A23L 2/54 222/1 |
| 5,853,782 A | 12/1998 | Larsson |
| 6,138,995 A | 10/2000 | Page |

(Continued)

FOREIGN PATENT DOCUMENTS

| DE | 19849628 | * 5/2000 |
| EP | 1491491 B1 | 12/2006 |

(Continued)

OTHER PUBLICATIONS

English Translation for DE19849628 published May 2000.*

*Primary Examiner* — Anthony Weier
(74) *Attorney, Agent, or Firm* — Bryan W. Bockhop; Bockhop Intellectual Property Law, LLC (57) ABSTRACT

In a device for infusing a gas from a gas source into a liquid beverage, a beverage container defines an interior for holding the liquid beverage therein. A venturi mixing device has a liquid inlet port in fluid communication with the beverage container, a gas inlet port in fluid communication with the gas source and a discharge port. The venturi mixing device is configured to infuse the gas received from the gas source into liquid beverage received from the beverage container. A faucet is in fluid communication with the discharge port of the venturi mixing device and is configured to dispense the liquid beverage infused with the gas.

15 Claims, 9 Drawing Sheets

(56) References Cited

U.S. PATENT DOCUMENTS

| | | | |
|---|---|---|---|
| 6,439,437 B1 * | 8/2002 | Ollier | A23L 2/54 141/129 |
| 6,562,386 B2 * | 5/2003 | Ruan | A23L 3/26 204/164 |
| 7,806,299 B2 | 10/2010 | Wauters et al. | |
| 7,984,845 B2 | 7/2011 | Kelly et al. | |
| 8,033,431 B2 | 10/2011 | Sommerfield et al. | |
| 8,038,039 B2 | 10/2011 | Kelly et al. | |
| 8,052,012 B2 | 11/2011 | Kelly et al. | |
| 8,141,755 B2 | 3/2012 | Kelly et al. | |
| 8,191,740 B2 | 6/2012 | Hoss et al. | |
| 8,371,478 B2 | 2/2013 | Sommerfield | |
| 8,438,969 B2 | 5/2013 | Gold et al. | |
| 8,985,395 B2 | 3/2015 | Tansey | |
| 9,233,824 B2 | 1/2016 | Kirschner et al. | |
| 9,346,024 B2 | 5/2016 | Page et al. | |
| 9,386,782 B2 | 7/2016 | Choi et al. | |
| 2010/0260914 A1 * | 10/2010 | Seta | A23L 2/54 426/590 |
| 2011/0223309 A1 * | 9/2011 | Daburger | A47J 31/002 426/595 |
| 2012/0305597 A1 * | 12/2012 | Larzul | A47J 31/4485 222/148 |
| 2014/0175125 A1 | 6/2014 | Breault | |
| 2014/0220207 A1 | 8/2014 | Page et al. | |
| 2014/0234514 A1 * | 8/2014 | Finley | A23C 9/1524 426/569 |
| 2014/0374443 A1 * | 12/2014 | Young | B67D 1/0406 222/105 |
| 2015/0151956 A1 | 6/2015 | Tansey | |
| 2015/0329343 A1 | 11/2015 | Kleinrchert | |
| 2016/0262417 A1 | 9/2016 | Choi et al. | |
| 2016/0280528 A1 | 9/2016 | Kleinrichert | |

FOREIGN PATENT DOCUMENTS

| | | | |
|---|---|---|---|
| GB | 2246523 | * | 5/1992 |
| GB | 2311332 | * | 9/1997 |
| WO | WO 2004/050535 A2 | | 6/2004 |
| WO | WO 2016/054050 A1 | | 4/2016 |

* cited by examiner

| Infusing-Gas Flow Measured in Line 114A, SCFH | | |
|---|---|---|
| Beverage Flow Measured in Line 115, gal/min - GPM | | |
| Gas/Liquid Ratios (SCFH/GPM, PPM by weight) | | |
| Acceptable Range | 0.75 - 2.8 | SCFH/GPM |
| | 120 - 500 | PPM by weight |
| Preferred Range | 1.0 - 1.5 | SCFH/GPM |
| | 160 - 260 | PPM by weight |

SYSTEMS TO NITROGEN-INFUSE AND DISPENSE BEVERAGES

CROSS-REFERENCE TO RELATED APPLICATION(S)

This application claims the benefit of U.S. Provisional Patent Application Ser. No. 62/309,006, filed Mar. 16, 2016, the entirety of which is hereby incorporated herein by reference.

BACKGROUND OF THE INVENTION

1. Field of the Invention

The present invention relates generally to systems and methods for liquid beverage dispensing and, more specifically, to systems and methods for infusing compressed gases such as nitrogen into chilled beverages such as coffee, and dispensing the gas-infused chilled beverages in a manner that causes a pleasing head of foam to be created and maintained on the surface of the beverage during and after dispensing into a receiving container.

2. Description of the Related Art

The storing and dispensing of chilled beverages using compressed nitrogen and other gases is used to generate a pleasing head of foam to form on the surface of beverages when they are dispensed into a cup or a mug. Existing nitrogen infusion typically employ porous membranes or other elaborate and bulky mixing components cause such infusion. Many such systems require gas permeable membranes that are subject to clogging. Other systems employ elaborate liquid and gas mixing schemes, which include multiple regulated liquid and gas pressures to achieve the desired gas infusion in combination with an acceptable dispensing rate and a desired appearance.

Thus, there is a need for chilled beverage gas-infusion and dispensing systems and methods that are simpler, have fewer components and are therefore easier to maintain, more reliable and have a lower cost than existing systems.

There is also a need for gas-infusion and dispensing systems and methods that consistently provide a high density, long-lasting head on dispensed chilled coffee.

There is also a need for gas-infusion and dispensing systems and method that provide a user-selectable proportion of head-to-settled liquid.

There is also a need for gas-infusion and dispensing systems and methods that infuse increased proportions of gas compared to existing systems, thereby providing a proportion of head-to-settled liquid, and a head density that is considered most appealing to those consuming the beverage.

SUMMARY OF THE INVENTION

The disadvantages of the prior art are overcome by the present invention which, in one aspect, is a device for infusing a gas from a gas source into a liquid beverage. A beverage container defines an interior for holding the liquid beverage therein. A venturi mixing device has a liquid inlet port in fluid communication with the beverage container, a gas inlet port in fluid communication with the gas source and a discharge port. The venturi mixing device is configured to infuse the gas received from the gas source into liquid beverage received from the beverage container. A faucet is in fluid communication with the discharge port of the venturi mixing device and is configured to dispense the liquid beverage infused with the gas.

In another aspect, the invention is a coffee serving device that includes a nitrogen tank, a pressure regulator, a coffee tank, a flow restricting device and a venturi mixing device. The pressure regulator is in fluid communication with the nitrogen tank. The coffee tank defines an interior for holding liquid coffee therein. An input fitting that is in fluid communication with the interior of the coffee tank couples the coffee tank to the pressure regulator. An output fitting is in fluid communication with the interior of the coffee tank. The coffee tank is configured so that gas pressure received through the input fitting forces coffee out of the beverage container through the output fitting. A flow restricting device is in fluid communication with the first pressure regulator. A venturi mixing device has a liquid inlet port in fluid communication with the output fitting, a gas inlet port in fluid communication with the flow restricting device and a discharge port. The venturi mixing device is configured to infuse nitrogen received through the flow restricting device into the coffee received from the output fitting of the beverage container. A faucet is in fluid communication with the discharge port of the venturi mixing device and is configured to dispense the coffee infused with nitrogen.

In yet another aspect, the invention a method of serving nitrogen-infused liquid beverage, in which liquid beverage is driven from a beverage container into a liquid inlet port of a venturi mixing device. Nitrogen is infused into the liquid beverage by driving nitrogen through a gas inlet port of the venturi mixing device, thereby delivering nitrogen-infused liquid beverage to a discharge port of the venturi mixing device. The nitrogen-infused liquid beverage is poured from the discharge port through a faucet.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
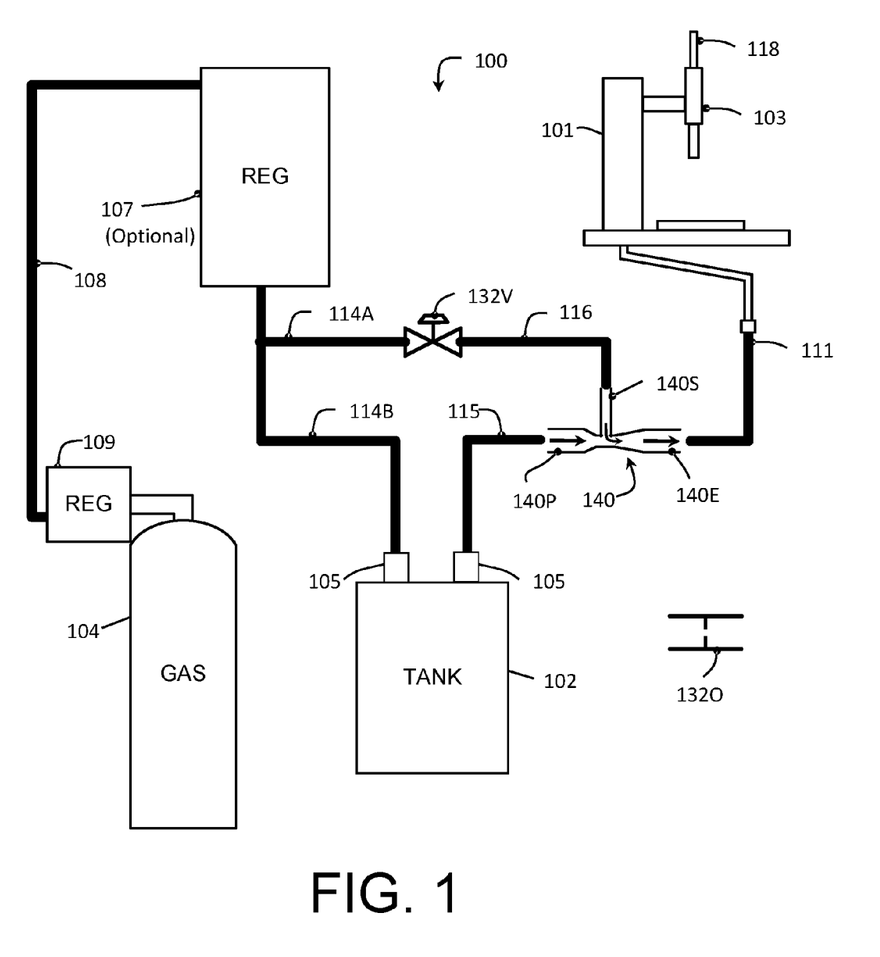
FIG. 1 is a schematic diagram of a first embodiment of a beverage gas-infusion and dispensing system.

As shown in FIG. 1, a gas infusion system 100 includes a pressured gas cylinder 104 that contains a gas or a gas mixture, which in one embodiment includes pure or substantially pure nitrogen. A pressure regulator 109 provides a regulated flow of gas into line 108 at a predetermined pressure. Typically, the regulator 109 would maintain gas pressure within the range of about 15 psi to 80 psi. In one embodiment, the regulator 109 maintains the gas pressure in a range of about 25 psi to 35 psi and in one specific embodiment it maintains the gas pressure within a range of about 28 psi to 32 psi. Depending on the specific application, the gas cylinder 104 may be located near to the beverage faucet assembly 101. In some applications, the gas cylinder 104 may be located away from beverage faucet assembly 101 for safety reasons. An optional secondary pressure regulator 107 may be provided near beverage faucet assembly 101 as a convenience, whereby the regulated pressure may be easily adjusted.

Line 108 or optional regulator 107 (if used), connects to lines 114A and 114B. Line 114B connects to an inlet port of pressurized beverage tank 102, where the connection may utilize a quick disconnect fitting 105 of a type that is well known in the beverage industry. Line 114A connects to the inlet port of a flow restricting device, such as valve 132V. A flow restricting orifice 132O may be used in place of valve 132V, and other types of gas flow restricting devices may also be used. In one embodiment, a precision needle valve may be used.

The exit port of valve 132V is connected to line 116 which connects to the suction inlet 140S of venturi mixing device 140. Line 115 connects the exit port of beverage tank 102 to pressure inlet port 140P of venturi mixing device 140. Line 111 connects exit port 140E of venturi mixing device 140 to beverage faucet assembly 101. When faucet 103 is closed, pressures within system 100 are in equilibrium. Check valves or ball valves (not shown) may be used in line 115 to prevent reverse flow (or shut off flow) of beverage from mixing device 140 into line 115 toward tank 102, and/or in line 116 to prevent reverse flow (or shut off flow) of gas, liquid beverage, or both through suction port 140S into line 116.

To dispense a gas-infused beverage, an operator moves faucet handle 118 to a partially-open or fully-open position. This allows pressurized gas within line 108 and then line 114B to displace liquid beverage from tank 102 causing liquid beverage to flow from the exit port of tank 102 into line 115. Tank 102 may be located within a refrigerator or refrigeration unit as commonly known in the beverage industry. Liquid beverage in line 115 then flows into pressure inlet port 140P of venturi mixing device 140. Simultaneously, pressurized gas in line 114A flows into and through valve 132V, exiting at a reduced pressure into line 116 and then flowing into suction inlet 140S. Within venturi mixing device 140, liquid beverage flows through a reduced cross-sectional area flow restriction adjacent suction inlet 140S as is well known for venturi mixing devices. The flow restriction causes a higher velocity and reduced static pressure within the beverage flow. The reduced static pressure entrains gas within line 116 and infuses the gas into the beverage flow. The gas-infused beverage exits port 140E into line 111. Finally, the gas-infused beverage flows through line 111 and is dispensed from faucet 103 into a receiving container.

Figure 2:
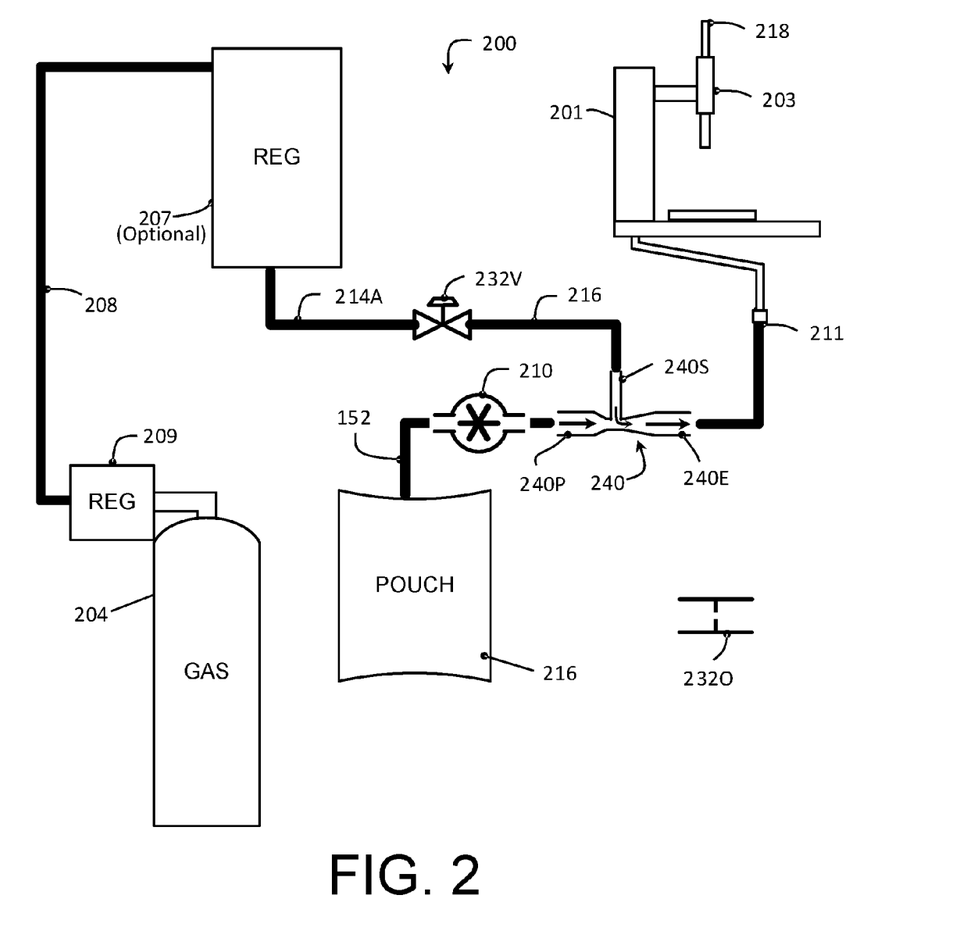
FIG. 2 is a schematic diagram of a second embodiment of a beverage gas-infusion and dispensing system.

As shown in FIG. 2, an alternate embodiment of a gas infusion system 200 employs a beverage bag 216 to hold the beverage. Beverage bags are commercially available in various sizes and with different materials of construction. Generally, a container of 1 to 5 gallons is utilized for the present invention, but any suitable container of size convenient to the intended application may also be utilized. A pressured gas cylinder 204 contains a gas or a gas mixture, preferably pure or substantially pure nitrogen. Pressure regulator 209 provides a regulated flow of gas into line 208 at a predetermined pressure. In one embodiment, an acceptable pressure within a range of about 15 psi to 80 psi, in certain applications the pressure is within a range of about 25 psi to 35 psi, and in certain specific applications the pressure is within a range of about 28 psi to 32 psi. Gas cylinder 204 may be located near to, or remotely from beverage faucet assembly 201. Gas cylinder 204 may be located in a remote location, away from beverage faucet assembly 201 for safety reasons. Optional secondary pressure regulator 207 may be provided near beverage faucet assembly 201 as a convenience, whereby the regulated pressure may be easily adjusted. Line 208 or optional regulator 207 (if used), connects to line 214A. Line 214A connects to the inlet port of a flow restricting device, illustrated as valve 232V. A flow restricting orifice 232O may be used in place of valve 232V, and other types of gas flow restricting devices may also be used. The exit port of valve 232V is connected to line 216 which connects to the suction inlet 240S of venturi mixing device 240. Line 215 connects the exit port of flexible beverage bag 216 to the inlet port of pump 210. Beverage bag 216 may be contained in a box (not shown). The box may be corrugated cardboard while the bag 216 may be constructed of any material accepted for use in the food and beverage industry. Pump 210 may be an air driven diaphragm pump as commonly known in the beverage industry, optionally driven using compressed gas from gas cylinder 204. Pump 210 may also be another type of pump such as an electrically-driven pump configured to operate when faucet handle 218 is partially or fully opened. The exit port of pump 210 connects to pressure inlet port 240P of venturi mixing device 240. Line 211 connects exit port 240E of venturi mixing device 240 to beverage faucet assembly 201. When faucet 203 is closed, pressures within system 200 are in equilibrium. Check valves (not shown) may be used to in line 215 to prevent reverse flow of beverage from mixing device 240 into line 115 toward pump 210, and/or in line 216 to prevent reverse flow of gas, liquid beverage, or both through suction port 240S into line 216. To dispense a gas-infused beverage, an operator moves faucet handle 218 to a partially-open or fully-open position. This causes pump 210 to operate and displace liquid beverage from bag 216 into line 215, through pump 210, flowing though the pump exit port and then into pressure inlet port 240P of venturi mixing device 240. Simultaneously, pressurized gas in line 208 and then line 214A flows into and through valve 232V, exiting at a reduced pressure into line 216 and then flowing into suction inlet 240S. Within venturi mixing device 240, liquid beverage flows through a reduced cross-sectional area flow restriction adjacent suction inlet 240S as is well known for venturi mixing devices. The flow restriction causes a higher velocity and reduced static pressure within the beverage flow. The reduced static pressure entrains gas within line 216 and infuses the gas into the beverage flow. The gas-infused beverage exits port 240E into line 211. Finally, the gas-infused beverage flows through line 211 and is dispensed from faucet 203 into a receiving container. Bag 216 may be located within a refrigerator or refrigeration unit as commonly known in the beverage industry.

Figure 3:
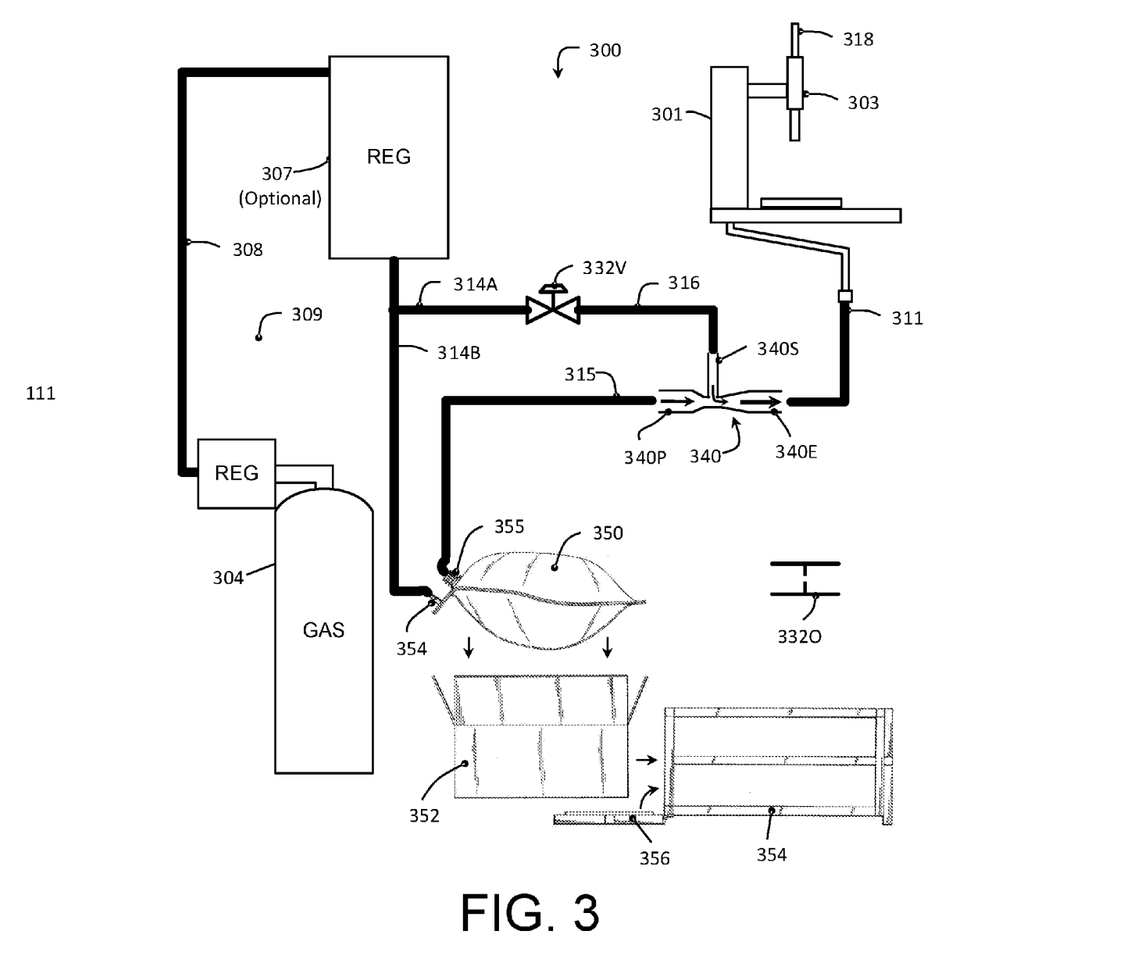
FIG. 3 is a schematic diagram of a third embodiment of a beverage gas-infusion and dispensing system.

Another embodiment of a beverage dispensing system 300 is shown in FIG. 3. A pressured gas cylinder 304 contains a gas or a gas mixture, which can be pure or substantially pure nitrogen. Pressure regulator 309 provides a regulated flow of gas into line 308 at a predetermined pressure. An acceptable pressure includes a pressure within the range of about 15 psi to 80 psi, in certain applications the pressure is within a range of about 25 psi to 35 psi, and in certain specific applications the pressure is within a range of about 28 psi to 32 psi. Gas cylinder 304 may be located near to, or remotely from beverage faucet assembly 301. Gas cylinder 304 may be located in a remote location, away from beverage faucet assembly 301 for safety reasons. Optional secondary pressure regulator 307 may be provided near beverage faucet assembly 301 as a convenience, whereby the regulated pressure may be easily adjusted. Line 308 or optional regulator 307 (if used), connects to lines 314A and 314B. A flexible beverage bag 350 is contained by a semi-rigid container 352 such as a cardboard box, comprising a structurally-constrained bag-in-box arrangement. One example of such a bag-in-box arrangement is disclosed in U.S. Pat. No. 4,796,788 to Bond, which is incorporated herein by reference. Container 352 is sized to fit within a structurally rigid container 352 with a lid 356 suitably attached using a hinge or other fastening arrangement. Beverage bag 350 can include two layers, with an inner layer to contain a liquid beverage, a separate outer layer surrounding the inner layer, a beverage outlet port 355 that connects to the volume formed by the bag inner layer, and a pressure inlet port 354 that connects to the volume formed between the bag layers. The outer layer of the bag is confined by container 352, and introduction of the pressurized gas through port 353 from line 314B causes the bag inner layer to be compressed thereby causing an outlet flow of beverage from beverage outlet port 355. Line 314A connects to the inlet port of a flow restricting device, illustrated as valve 332V. A flow restricting orifice 332O may be used in place of valve 332V in certain applications, and other types of gas flow restricting devices well known to the art may also be used. The exit port of valve 332V is connected to line 316 which connects to the suction inlet 340S of venturi mixing device 340. Line 315 connects the exit port 355 of beverage bag 350 to pressure inlet port 340P of venturi mixing device 140. Line 311 connects exit port 340E of venturi mixing device 340 to beverage faucet assembly 301. When faucet 303 is closed, pressures within system 300 are in equilibrium. Check valves (not shown) may be used in line 315 to prevent reverse flow of beverage from mixing device 340 into line 315 toward bag 350, and/or in line 316 to prevent reverse flow of gas, liquid beverage, or both through suction port 340S into line 316. To dispense a gas-infused beverage, an operator moves faucet handle 318 to a partially-open or fully-open position. This allows pressurized gas within line 308 and then line 314B to displace liquid beverage from bag 350 causing liquid beverage to flow from bag exit port 355 into line 315. Liquid beverage in line 315 then flows into pressure inlet port 340P of venturi mixing device 340. Simultaneously, pressurized gas in line 314A flows into and through valve 332V, exiting at a reduced pressure into line 316 and then flowing into suction inlet 340S. Within venturi mixing device 340, liquid beverage flows through a reduced cross-sectional area flow restriction adjacent suction inlet 340S as is well known for venturi mixing devices. The flow restriction causes a higher velocity and reduced static pressure within the beverage flow. The reduced static pressure entrains gas within line 316 and infuses the gas into the beverage flow. The gas-infused beverage exits port 340E into line 311. Finally, the gas-infused beverage flows through line 311 and is dispensed from faucet 303 into a receiving container. Container 352 may be located within a refrigerator or refrigeration unit as commonly known in the beverage industry.

Figure 4:
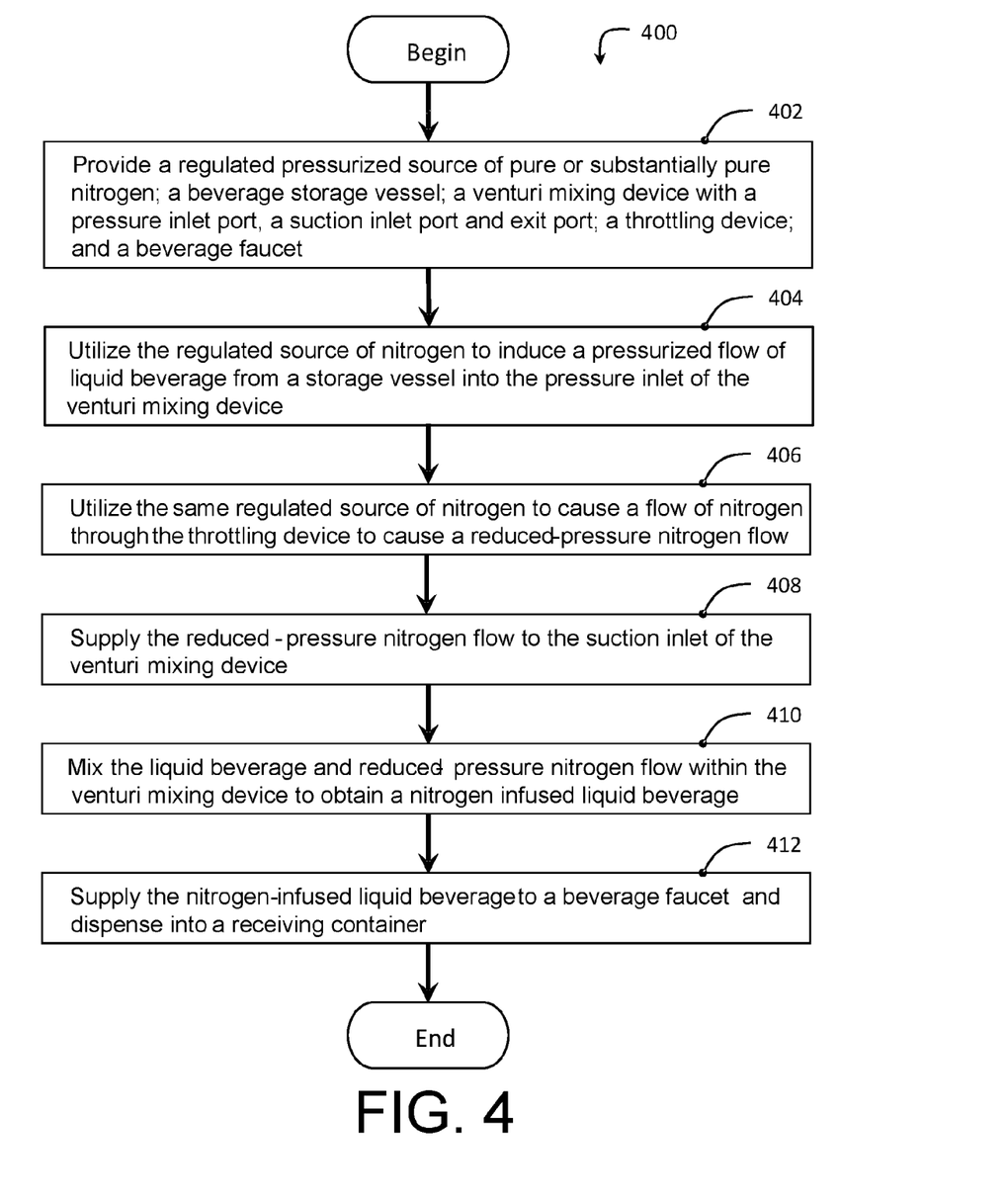
FIG. 4 is a flow chart showing one method of nitrogen-infusing and dispensing a beverage.

FIG. 4 illustrates a method 400 to nitrogen-infuse and dispense a beverage which could be employed using the embodiments shown in FIGS. 1 and 3. Step 402 includes providing a regulated pressurized source of pure or substantially pure nitrogen; a beverage storage vessel; a venturi mixing device with a pressure inlet port, a suction inlet port and exit port; a throttling device; and a beverage faucet. Step 404 includes utilizing the regulated source of nitrogen to induce a pressurized flow of liquid beverage from a storage vessel into the pressure inlet of the venturi mixing device. Step 406 includes utilizing the same regulated source of nitrogen to cause a flow of nitrogen through the throttling device to cause a reduced-pressure nitrogen flow. Step 408 includes supplying the reduced-pressure nitrogen flow to the suction inlet of the venturi mixing device. Step 410 includes mixing the liquid beverage and reduced-pressure nitrogen flow within the venturi mixing device to obtain a nitrogen infused liquid beverage. Step 412 includes supplying the nitrogen-infused liquid beverage to a beverage faucet and dispensing into a receiving container.

Figure 5:
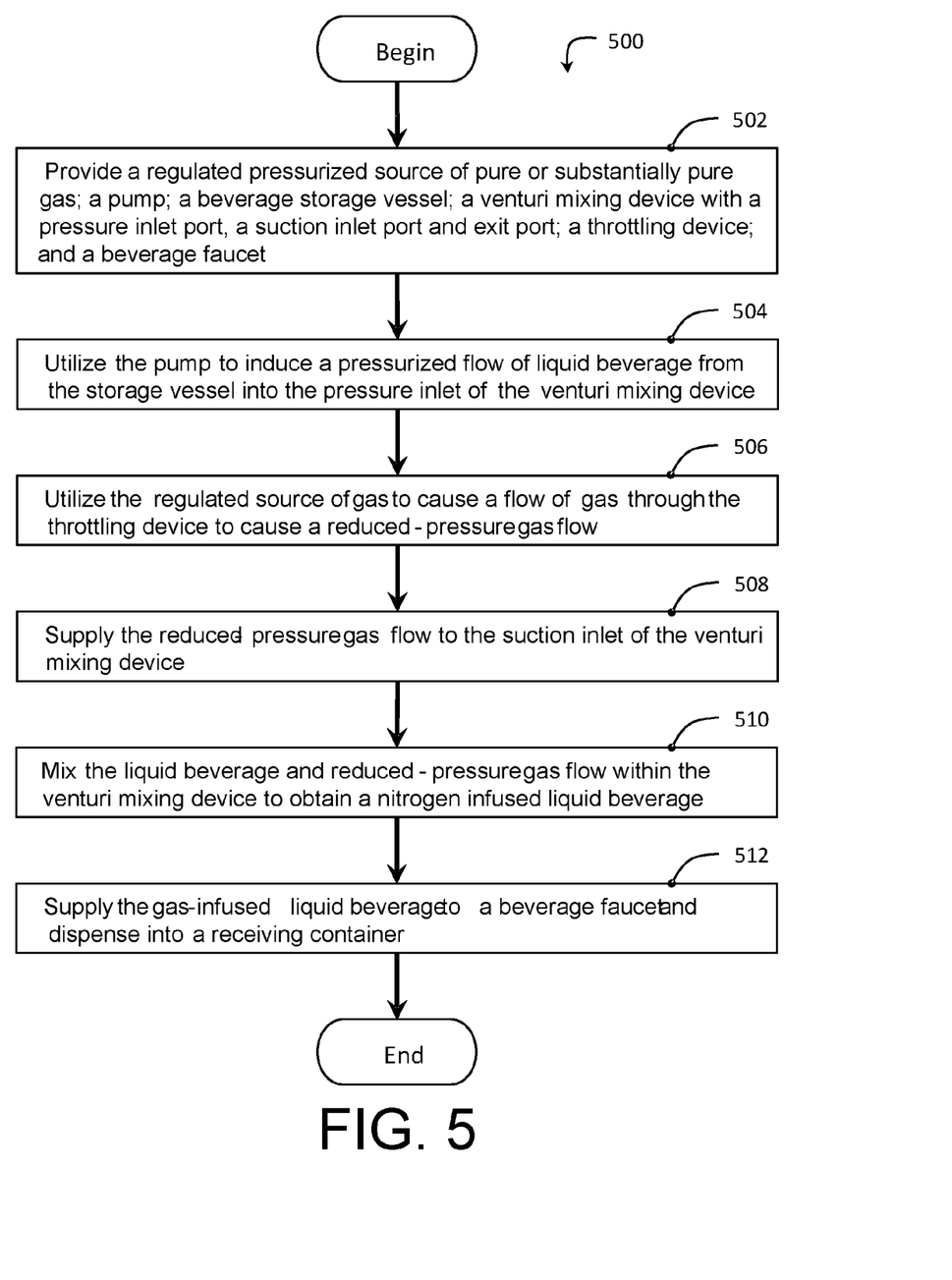
FIG. 5 is a flow chart showing a method of gas-infusing and dispensing a beverage.

In one embodiment of a gas infusion method 500, as shown in FIG. 5, step 502 includes providing a regulated pressurized source of pure or substantially pure gas; a pump; a beverage storage vessel; a venturi mixing device with a pressure inlet port, a suction inlet port and exit port; a throttling device; and a beverage faucet. Step 504 includes utilizing the pump to induce a pressurized flow of liquid beverage from the storage vessel into the pressure inlet of the venturi mixing device. Step 506 includes utilizing the regulated source of gas to cause a flow of gas through the throttling device to cause a reduced-pressure gas flow. Step 508 includes supplying the reduced-pressure gas flow to the suction inlet of the venturi mixing device. Step 510 includes mixing the liquid beverage and reduced-pressure gas flow within the venturi mixing device to obtain a nitrogen infused liquid beverage. Step 512 includes supplying the gas-infused liquid beverage to a beverage faucet and dispensing into a receiving container.

Figure 6:
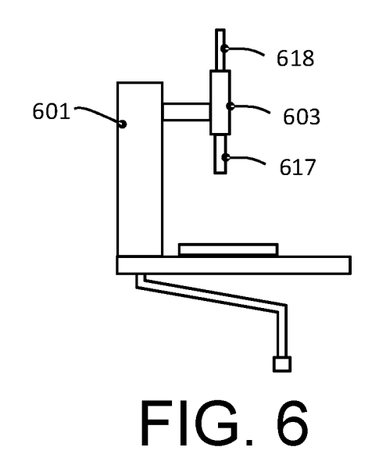
FIG. 6 is a schematic diagram of a beverage dispensing faucet assembly.

One embodiment of a dispensing faucet assembly is shown in FIG. 6, in which a beverage faucet 601 can include a slow pour faucet 603 equipped with tap handle 618. Faucet 603 can also be equipped with a restrictor nozzle 617 which can further include a restrictor disc (not shown) as commonly known in the beverage industry for dispensing stout beers. Beverage faucet 601 may help provide a high density, long-lasting settled head on chilled coffee dispensed according to embodiments of the present invention, in particular when operated using predetermined pressures and temperatures. Beverage faucet 601 may also comprise multiple slow pour faucets for dispensing multiple beverages from a single location.

Figure 7:
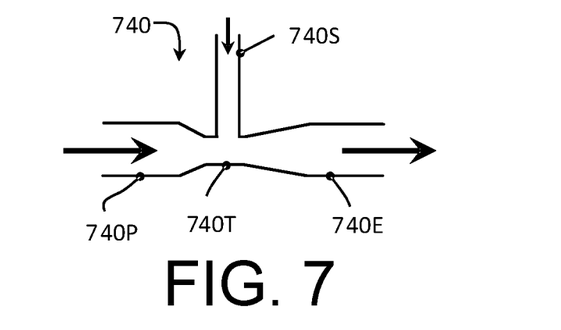
FIG. 7 is a schematic diagram of a first example of a venturi mixing device.

A first example of a venturi mixing device 740, as shown in FIG. 7, includes pressure inlet port 740P, suction inlet port 740S, flow restriction 740T and exit port 740E. Pressurized liquid beverage enters through pressure inlet port 740P and pressurized gas enters through suction inlet port 740S. Within venturi mixing device 740, liquid beverage flows through flow restriction 740T with a reduced cross-sectional area as is well known for venturi mixing devices. Flow restriction 740T causes a higher velocity and reduced static pressure within the beverage flow adjacent port 740S which entrains gas entering through port 740S and infuses the gas into the beverage flow. The gas-infused beverage exits device 740 through exit port 740E. U.S. Pat. No. 2,210,846 to Aghnides, U.S. Pat. No. 2,571,870 to Hayes, and U.S. Pat. No. 2,800,313 to Targosh et al. illustrate venturi mixing devices or eductors and are incorporated herein by reference for the purpose of showing venturi/eductor devices and methods of making such devices.

Figure 8:
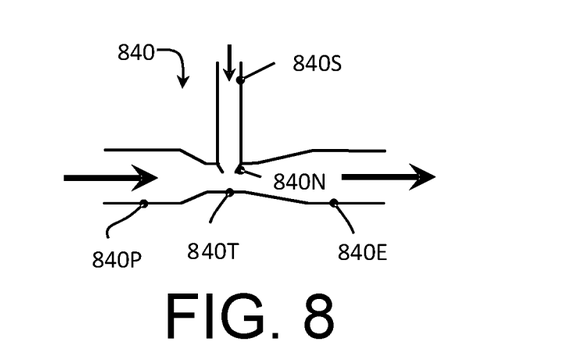
FIG. 8 is a schematic diagram of a second example of a venturi mixing device.

A second example of a venturi mixing device 840, as shown in FIG. 8, includes pressure inlet port 840P, suction inlet port 840S, flow restriction 840T and exit port 840E. Pressurized liquid beverage enters through pressure inlet port 840P and pressurized gas enters through suction inlet port 840S. A nozzle 840N may be present and protrude into flow restriction 840T. Within venturi mixing device 840, liquid beverage flows through flow restriction 840T with a reduced cross-sectional area as is well known for venturi mixing devices. Flow restriction 840T causes a higher velocity and reduced static pressure within the beverage flow adjacent port 840S which entrains gas entering through port 840S and infuses the gas into the beverage flow. Nozzle 840N may enhance the gas infusion into the liquid beverage. The gas-infused beverage exits device 840 through exit port 840E.

Figure 9:
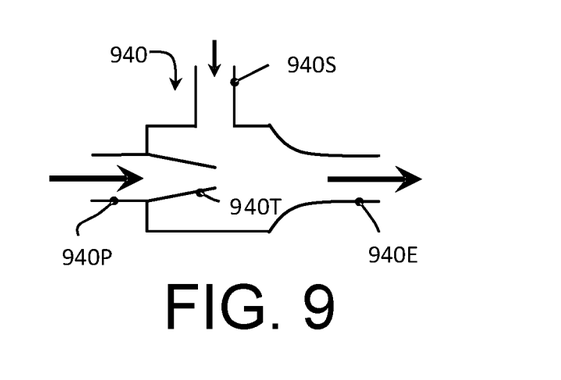
FIG. 9 is a schematic diagram of a third example of a venturi mixing device.

A third example of a venturi mixing device 940, as shown in FIG. 9, includes an eductor that includes pressure inlet port 940P, suction inlet port 940S, flow nozzle 940T and exit port 940E. Pressurized liquid beverage enters through pressure inlet port 940P and pressurized gas enters through suction inlet port 940S. Within venturi mixing device 940, liquid beverage flows through flow nozzle 940T with a reduced cross-sectional area as is well known for eductors. Flow nozzle 940T causes a higher velocity and reduced static pressure within the beverage flow adjacent port 940S which entrains gas entering through port 940S and infuses the gas into the beverage flow. The gas-infused beverage exits device 940 through exit port 940E. In one embodiment, the eductor could include a T-fitting.

A venturi mixing device may be fabricated as a single unit as illustrated in FIGS. 7 through 9, or may be assembled using commonly available pipe or tube fittings. For example, a venturi mixing assembly may be constructed of a standard tee fitting and two reduction fittings, wherein the small ends of the reduction fittings are sized to match the ends of the tee fittings. The small ends of the first and second reduction fittings are assembled to either end of the tee fitting. When used in the present invention, the liquid beverage flows into the large end and then the small end of the first reduction fitting, through the tee fitting and past the right-angle port of the tee, through the small end of the second reduction fitting and then exits through the large end of the second reduction fitting. The reduced cross-sectional area within the tee fitting creates higher velocity and reduced static pressure within the beverage flow adjacent the right-angle port of the tee fitting, and thus the right angle port of the tee functions as the suction inlet of the venturi mixing assembly. In this manner a venturi mixing assembly may be assembled from inexpensive pipe or tube fittings which may be lower cost as compared to single unit venturi mixing devices.

Embodiments of the present invention include components that can cooperate to gas-infuse, dispense and provide a pleasing proportion of settled head on a liquid beverage. The volume of the settled head produced by embodiments of the present invention can be greater than about fifteen percent, greater than about twenty five percent, and can also be about thirty percent of the total volume occupied by the settled head and the underlying liquid beverage within a receiving container. The liquid beverage may be dispensed using a pressure within the range of about 15 psi to 80 psi, and in one embodiment within a range of about 25 psi to 45 psi, and in a specific embodiment within a range of about 28 psi to 32 psi. In some embodiments, the liquid beverage is cooled to a temperature of about 33° F. to 40° F. prior to dispensing. In other embodiments, the liquid beverage is coffee that is cooled to a temperature of about 34° F. to 37° F. prior to dispensing. The volume of the settled head may be adjusted by a user and can depend upon the pressure and temperature of the chilled beverage as well as the design of the individual components that comprise various embodiments of the present invention.

Figure 10:
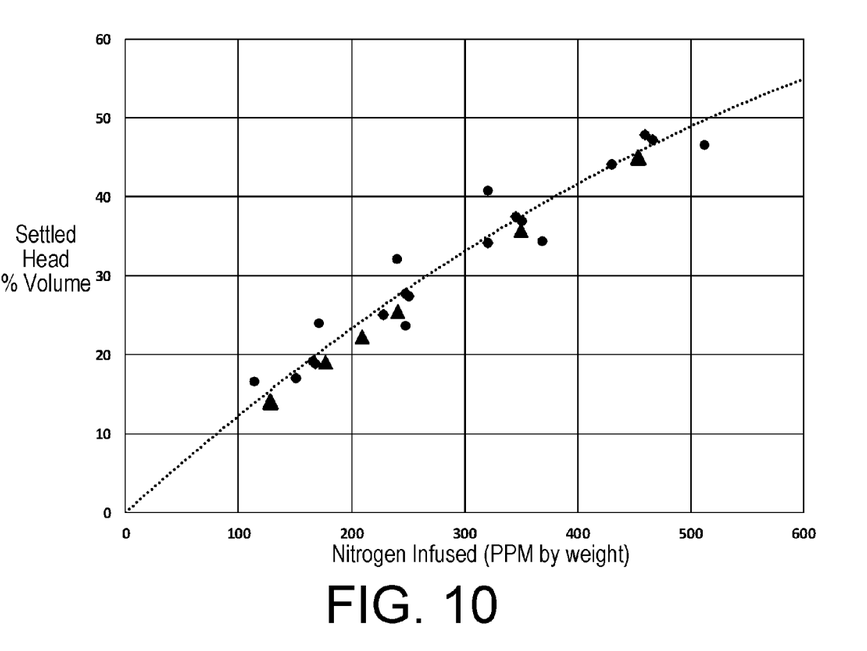
FIG. 10 is a chart that illustrates the percent volume of settled head versus the amount of infused nitrogen for a particular chilled coffee beverage that is dispensed.

The percent volume of settled head versus the amount of infused nitrogen for a particular chilled coffee beverage that is dispensed according to embodiments of the invention is shown in FIG. 10. The solid diamond symbols represent performance for predetermined pressures and temperatures, the solid circle symbols represent performance for other pressures and temperatures that fall within the scope of the present invention. (The solid triangle symbols represent performance for particular experiments conducted at about 35 psi regulated gas pressure, liquid beverage temperature of about 35° F., and liquid beverage flow of about 0.28 U.S. gallons per minute.) According to FIG. 10, for this particular beverage a settled head of greater than about fifteen percent volume requires nitrogen infusion greater than about 100 parts per million (ppm) by weight. A settled head of greater than about twenty five percent requires nitrogen infusion greater than about 220 ppm. A settled head of about thirty percent requires nitrogen infusion greater than about 250 ppm. Now referring to FIG. 1, flow restricting device 132V or 132O can be designed to cooperate with a membrane-free eductor 140 (such as a venturi) to infuse nitrogen into a liquid beverage at greater than about 100 ppm by weight for an embodiment of the invention, greater than about 160 ppm for one example of an embodiment of the invention, and greater than about 250 ppm for another example of an embodiment of the invention. Other types of beverages may require differing amounts of infused nitrogen to provide a desired percentage of settled head. One beverage may have a differing amount of total dissolved solids (TDS) than another beverage, and the TDS may influence the volume of settled head. Increased TDS in a beverage may result in reduced settled head and vice versa.

Figure 11:
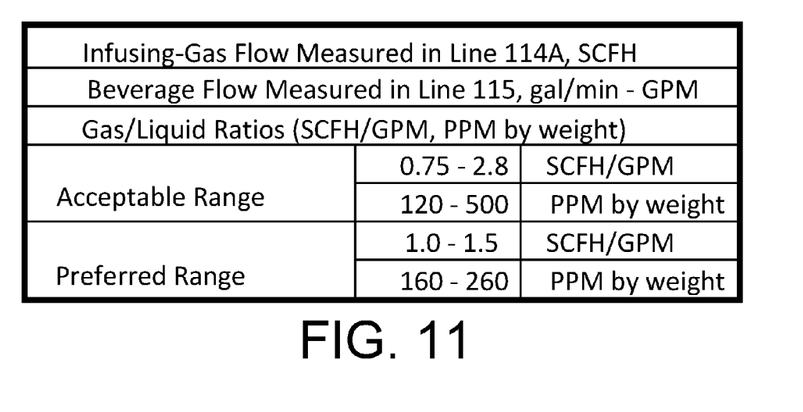
FIG. 11 is a tabulation of data and results from dispensing experiments conducted with one representative embodiment of the invention.

A tabulation of data and results from dispensing experiments conducted with a first embodiment of the invention is shown in FIG. 11. In these experiments, gas and liquid flow meters were inserted into lines 114A and 115 (as shown in FIG. 1), respectively, to measure the infusing gas flow and liquid beverage flow, respectively. For example, in one experiment the infusing gas was nitrogen, and the liquid beverage was chilled coffee. The regulated gas pressure was about 35 psi, and the chilled coffee temperature was about 35° F. The measured chilled coffee flow was about 0.28 U.S. gallons per minute (GPM), and the measured nitrogen flow was about 0.35 standard cubic feet per hour (SCFH). Dividing the nitrogen flow by the chilled coffee flow results in a ratio of about 1.25 SCFH/GPM. The calculated gas flow (and nitrogen infusion) for this experiment on a weight basis is about 200 ppm. Performance for various embodiments of the invention at various dispensing conditions is described in FIG. 11.

The flow restricting device 132V or 132O is designed to operate with venturi mixing device 140 using known design rules for fluid flow through such devices. Embodiments of the invention can include a flow control orifice 132O with a diameter of less than about 0.05 inches for use with a venturi mixing device 140 that has a through-flow of about 1 U.S. gallons per minute or less at predetermined pressures and temperatures. Embodiments of the invention can include a precision needle valve to provide a user-adjustment for infused nitrogen and thus a means to control and adjust the amount of settled head. Other orifice and venturi mixing device sizes and designs fall within the scope of the present invention.

Figure 12:
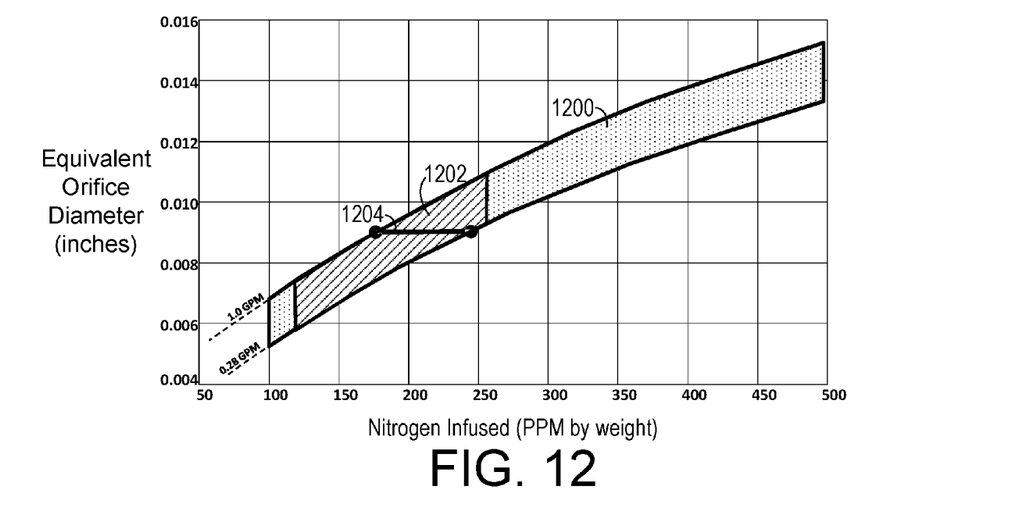
FIG. 12 is a chart that illustrates equivalent orifice sizes associated with the acceptable and desired ranges of FIG. 11.

As shown in FIG. 12, equivalent orifice sizes are associated with the acceptable and predetermined ranges of FIG. 11. The shaded area 1200 represents the acceptable range; the cross-hatched area 1202 represents the predetermined range. As discussed above, the flow restricting device can include valve 132V or orifice 132O. Valve 132V can include a precision needle valve. The equivalent orifices sizes in FIG. 12 can represent the characteristics of valve 132V when adjusted to provide the flow of an orifice of a desired diameter. Embodiments of the invention can include a flow restricting device with flow performance equivalent to orifices ranging in diameter from about 0.005 inches to about 0.015 inches. For example, the horizontal line 1204 drawn at 0.009 inches in FIG. 12 can represent an orifice 132O of 0.009 inches diameter or a valve 132V adjusted to provide the same flow as a 0.009 inch diameter orifice. The gas flow thus provided results in gas infusion of about 175 ppm to about 250 ppm on a weight basis for liquid beverage flows of about 1 to about 0.28 U.S. gallons per minute, respectively.

The pressures and temperatures disclosed herein can create conditions favorable for dispensing the beverage through a slow pour faucet as previously described. As the nitrogen-infused beverage exits the faucet nozzle, the infused nitrogen undergoes a volume expansion of about 2.7-to-1 (at 25 psi regulated pressure) to about 3.4-to-1 (at 35 psi regulated pressure) as the infused nitrogen equilibrates to ambient pressure. At these pressures a settled head with a pleasing creamy texture is formed. Higher pressures may cause expansion that is too large and/or too rapid, thereby causing excessive foam and/or faucet sputtering. Lower pressures may cause insufficient head with a less-creamy texture.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A device for infusing a gas from a gas source including a pressure regulator into a liquid beverage, comprising:
    (a) a beverage container defining an interior for holding the liquid beverage therein;
    (b) a venturi mixing device having a liquid inlet port in fluid communication with the beverage container, a gas inlet port in fluid communication with the gas source and a discharge port, the venturi mixing device configured to infuse the gas received from the gas source into liquid beverage received from the beverage container;
    (c) a faucet in fluid communication with the discharge port of the venturi mixing device and configured to dispense the liquid beverage infused with the gas; and
    (d) a flow restricting device, in fluid communication with the gas source and the inlet port of the venturi mixing device, that is configured to throttle gas flow from the gas source into the inlet port.

2. The device of claim 1, wherein the venturi mixing device comprises an eductor.

3. The device of claim 1, wherein the venturi mixing device comprises a membrane-free venturi mixing device.

4. The device of claim 1, wherein the gas source comprises:
    (a) a compressed gas tank; and
    (b) a first pressure regulator in fluid communication with the compressed gas tank.

5. The device of claim 4, further comprising an adjustable second pressure regulator, in fluid communication with the first pressure regulator and the inlet port of the venturi mixing device, that is configure to allow adjustment of gas pressure going into the inlet port.

6. The device of claim 1, wherein the beverage container comprises a pouch and further comprising a pump that is configured to pump liquid beverage from the pouch to the liquid inlet port of the venturi mixing device.

7. The device of claim 1, wherein the beverage container comprises: a beverage tank; an input fitting in fluid communication with the interior of the beverage tank and coupling the tank to the gas source; and an output fitting in fluid communication with the interior of the beverage tank, the beverage tank configured so that gas pressure received through the input fitting forces liquid beverage out of the beverage tank through the output fitting.

8. The device of claim 7, wherein the input fitting and the output fitting each comprises a quick disconnect fitting.

9. The device of claim 1, wherein the flow restricting device comprises a selected one of an adjustable valve and an orifice.

10. The device of claim 1, wherein the beverage comprises coffee.

11. The device of claim 1, wherein the gas comprises a gas selected from a list of gases consisting of: nitrogen, carbon dioxide, and combinations thereof.

12. A coffee serving device, comprising:
    (a) a nitrogen tank;
    (b) a pressure regulator in fluid communication with the nitrogen tank;
    (c) a coffee tank defining an interior for holding liquid coffee therein, an input fitting in fluid communication with the interior of the coffee tank coupling the coffee tank to the pressure regulator, an output fitting in fluid communication with the interior of the coffee tank, the coffee tank configured so that gas pressure received through the input fitting forces coffee out of the beverage container through the output fitting;

(d) a flow restricting device in fluid communication with the pressure regulator;

(e) a venturi mixing device having a liquid inlet port in fluid communication with the output fitting, a gas inlet port in fluid communication with the flow restricting device and a discharge port, the venturi mixing device configured to infuse nitrogen received through the flow restricting device into the coffee received from the output fitting of the beverage container; and (f) a faucet in fluid communication with the discharge port of the venturi mixing device configured to dispense the coffee infused with nitrogen.

13. The device of claim 12, wherein the input fitting and the output fitting each comprises a quick disconnect fitting.

14. The device of claim 12, wherein the flow restricting device comprises a selected one of a valve and flow restricting orifice.

15. The device of claim 12, wherein the venturi mixing device comprises an eductor.

* * * * *